United States Patent
Junk et al.

(10) Patent No.: US 11,098,147 B2
(45) Date of Patent: Aug. 24, 2021

(54) AQUEOUS POLYMER DISPERSIONS

(71) Applicant: CELANESE INTERNATIONAL CORPORATION, Irving, TX (US)

(72) Inventors: Matthias Junk, Alsbach-Hähnlein (DE); Harald Petri, Aarbergen (DE); Stephan Krieger, Hofheim (DE)

(73) Assignee: CELANESE INTERNATIONAL CORPORATION, Irving, TX (US)

( * ) Notice: Subject to any disclaimer, the term of this patent is extended or adjusted under 35 U.S.C. 154(b) by 59 days.

(21) Appl. No.: 16/480,796

(22) PCT Filed: Jan. 27, 2017

(86) PCT No.: PCT/US2017/015419
§ 371 (c)(1),
(2) Date: Jul. 25, 2019

(87) PCT Pub. No.: WO2018/140042
PCT Pub. Date: Aug. 2, 2018

(65) Prior Publication Data
US 2019/0389993 A1 Dec. 26, 2019

(51) Int. Cl.
*C08F 265/06* (2006.01)
*C08F 2/22* (2006.01)
*C08F 220/18* (2006.01)
*C08F 220/54* (2006.01)
*C09D 151/00* (2006.01)

(52) U.S. Cl.
CPC .............. *C08F 265/06* (2013.01); *C08F 2/22* (2013.01); *C08F 220/18* (2013.01); *C08F 220/54* (2013.01); *C09D 151/003* (2013.01); *C08F 220/1804* (2020.02)

(58) Field of Classification Search
CPC ........ C08F 265/06; C08F 2/22; C08F 220/18; C08F 220/65; C08F 220/1804; C08F 2/24; C08F 2/001; C08F 2/26; C09D 151/003; C09D 5/14; C09D 7/61; C09D 5/02; C09D 133/02; C09D 133/068; C09D 133/10; C09D 133/12; C09D 143/04; C09D 5/03; C09D 7/1216; C09D 133/24; C08L 33/068; C08L 33/10; C08L 33/12
USPC .................. 523/201, 122; 524/460
See application file for complete search history.

(56) References Cited

U.S. PATENT DOCUMENTS

| | | | |
|---|---|---|---|
| 4,654,397 A | 3/1987 | Mueller et al. | |
| 5,185,387 A | 2/1993 | Klesse et al. | |
| 5,596,035 A | 1/1997 | Desor et al. | |
| 6,005,042 A | 12/1999 | Desor et al. | |
| 6,531,185 B1 | 3/2003 | Drujon et al. | |
| 7,285,590 B2 | 10/2007 | Holub et al. | |
| 8,492,472 B2 | 7/2013 | Elizalde et al. | |
| 8,530,574 B2 | 9/2013 | Balk et al. | |
| 9,029,454 B2 | 5/2015 | Deller et al. | |
| 9,102,848 B2 | 8/2015 | Hamilton et al. | |
| 10,662,273 B2* | 5/2020 | Junk | C08L 33/10 |
| 2005/0250920 A1* | 11/2005 | Chowdhry | C08F 110/02 |
| | | | 526/217 |
| 2006/0047062 A1* | 3/2006 | Hsu | C09D 133/066 |
| | | | 524/556 |
| 2007/0244238 A1 | 10/2007 | Desor et al. | |
| 2010/0216942 A1* | 8/2010 | Lohmeijer | C04B 40/0042 |
| | | | 524/588 |
| 2012/0121903 A1 | 5/2012 | Betremieux et al. | |
| 2013/0190448 A1 | 7/2013 | Deller et al. | |
| 2014/0323608 A1 | 10/2014 | Deller et al. | |
| 2014/0350172 A1* | 11/2014 | Belmonte Rodrigues De Castro | C08F 2/22 |
| | | | 524/561 |
| 2016/0145430 A1* | 5/2016 | Junk | C09D 151/003 |
| | | | 524/801 |
| 2017/0174905 A1 | 6/2017 | Bohling et al. | |
| 2018/0002563 A1 | 1/2018 | Taylor | |

FOREIGN PATENT DOCUMENTS

WO 2012130712 A1 10/2012
WO 2016000989 A1 1/2016

OTHER PUBLICATIONS

International Search Report and Written Opinion issued in the corresponding Application No. PCT/US2017/015419 dated Oct. 9, 2017.

* cited by examiner

*Primary Examiner* — Hannah J Pak
(74) *Attorney, Agent, or Firm* — Roberts Calderon Safran & Cole P.C.

(57) ABSTRACT

An aqueous polymer dispersion is produced by multistage emulsion polymerization, in which a monomer composition I comprising 19 to 29 wt % hard monomers and 64 to 74 wt % soft monomers is polymerized to produce a first polymer phase and then a monomer composition II comprising 65 to 95 wt % hard monomers and 5 to 35 wt % soft monomers is polymerized to produce a second polymer phase. Monomer composition I also comprises from 1 to 5 wt % of at least one monomer selected from ethylenically unsaturated sulfonic acids, phosphonic acids, phosphoric acids, carboxylic acids, carboxylic amides, carboxylic anhydrides and mixtures thereof and 1 to 7.5 wt % of ethylenically unsaturated monomers containing keto groups. The weight ratio of monomer composition I to monomer composition II ranges from 50:50 to 65:35 and the polymer dispersion also contains a water-soluble cross-linking component selected from polyfunctional carboxylic hydrazides and/or polyfunctional amines.

19 Claims, No Drawings

AQUEOUS POLYMER DISPERSIONS

CROSS-REFERENCE TO RELATED APPLICATIONS

The present application is a U.S. National Phase of PCT/US2017/015419 filed on Jan. 27, 2017. The disclosure of the PCT Application is hereby incorporated by reference into the present Application.

FIELD

The present invention relates to aqueous polymer dispersions useful as binders for coating compositions, such as high gloss paints, lacquers, stains and varnishes.

BACKGROUND

While emission-minimized flat interior paints dominate the market in many countries, most water-based glossy lacquers and paints still contain a noticeable fraction of solvents and coalescent agents to facilitate film formation at low temperatures. Due to ever more stringent regulations and requirements to obtain eco-related certificates, there is an increasing need for aqueous dispersions that allow low temperature film formation without the use of coalescent agents while on the other hand not compromising the benefits of traditional binders for glossy coatings, such as good gloss formation, good block resistance, good scratch resistance, good solvent resistance, and good elasticity.

For example, U.S. Pat. No. 5,596,035 discloses a self-crosslinking aqueous dispersion with a minimum film forming temperature (MFFT) from 0 to 50° C. as a binder for clear coats and pigmented coatings, comprising at least one carbonyl-containing soft polymer dispersion with an MFFT below 20° C., at least one hard polymer dispersion with an MFFT above 25° C. and at least one polyfunctional hydrazide compound. Such blends of soft and hard polymer latexes are well suited to produce binders exhibiting good block resistance, scratch resistance and solvent resistance. However, the elasticity of these blends is usually insufficient to permit their application on wood and other substrates which are not dimensionally stable.

One technique that has been extensively investigated for obtaining aqueous polymer dispersions with improved elasticity characteristics is multi-stage polymerization using monomer compositions formulated to produce polymer particles having a core and shell with different compositions.

For example, U.S. Pat. No. 4,654,397 discloses the preparation of an aqueous polymer dispersion which has a low film-forming temperature and produces films having a high block resistance, by multistage emulsion polymerization of monoolefinically unsaturated monomers A, whose homopolymers have a glass transition temperature of from 0 to −72° C., with monoolefinically unsaturated monomers B, whose homopolymers have a glass transition temperature of from 80 to 140° C., and from 0.2 to 6% by weight of monoolefinically unsaturated monomers C which possess carboxyl and/or carboxamide groups. In a first stage, polymerization is conducted with a monomer mixture comprising from 75 to 98 parts by weight of monomer A, from 2 to 25 parts by weight of monomer B, and from 0.5 to 10 parts by weight of monomer C, while in a second stage the monomer mixture comprises from 75 to 98 parts by weight of monomer B, from 2 to 25 parts by weight of monomer A and from 0 to 10 parts by weight of monomer C. However, owing to the use of a high proportion of soft monomers A in the first stage, the corresponding polymer films have deficiencies in the context of their scratch resistance.

U.S. Pat. No. 6,005,042 discloses a polymer dispersion having a minimum film-forming temperature in the range from 0 to 40° C., which is useful in coating compositions for substrates, in the form of varnishes or gloss paints, and which is also obtained by stepwise emulsion polymerization. In this case, the first polymerization stage employs a monomer composition I comprising from 50 to 68.5% by weight of soft monomers A whose homopolymers have a glass transition temperature ($T_g$) below 0° C.; from 30 to 50% by weight of hard monomers B whose homopolymers have a glass transition temperature ($T_g$) above 65° C.; from 0.5 to 5% by weight of α,β-unsaturated carboxylic acids and/or carboxamides C which are copolymerizable with A and B; and from 1 to 7.5% by weight of ethylenically unsaturated monomers D containing keto groups, while the second stage employs a monomer composition II comprising from 5 to 45% by weight of the soft monomers A; from 65 to 95% by weight of the hard monomers B; from 0 to 4% by weight of α,β-unsaturated carboxylic acids and/or carboxamides C; and from 0 to 5% by weight of ethylenically unsaturated monomers D containing keto groups; wherein the weight ratio of the monomer composition I to the monomer composition II is from 50:50 to 75:25. However, although the resultant dispersion allows the production of water-based glossy paints and lacquers with good gloss, and good scratch, block, and solvent resistance, the minimum film forming temperature (MFFT) is generally too high to permit the formulation of coatings without solvents and coalescent agents.

Thus, despite these advances, there remains a need for aqueous polymer dispersions that allow the formulation of solvent, plasticizer and coalescent agent-free coatings which form defect-free films at application temperatures below 5° C. while maintaining the other properties required of high quality finishes, especially a high scratch resistance as well as high gloss, high block resistance, and high solvent resistance.

SUMMARY

In one aspect, the invention resides in an aqueous polymer dispersion having a minimum film forming temperature (MFFT) less than 5° C., preferably less than 1° C., obtained by radically initiated multi-stage emulsion polymerization and comprising particles with a first polymer phase formed from a monomer composition I and a second polymer phase formed after the first polymer phase from a monomer composition II, wherein the weight ratio of monomer composition I to monomer composition II ranges from 50:50 to 65:35, preferably from 55:45 to 60:40, wherein the monomer composition I comprises, based on the total amount of monomers in monomer composition I:

from 19 to 29% by weight of monomers A, different from the monomers C and D, whose homopolymers have a glass transition temperature from 80 to 150° C.;

from 64 to 74% by weight of monomers B, different from the monomers C and D, whose homopolymers have a glass transition temperature below 0° C.;

from 1 to 5% by weight of at least one monomer C selected from the group consisting of ethylenically unsaturated sulfonic acids, ethylenically unsaturated phosphonic and phosphoric acids, ethylenically unsaturated carboxylic acids, ethylenically unsaturated carboxylic amides, ethylenically unsaturated carboxylic anhydrides and mixtures thereof;

from 1 to 7.5% by weight of ethylenically unsaturated monomers D containing keto groups; and from 0 to 10% by weight of other ethylenically unsaturated monomers E, wherein the monomer composition II comprises, based on the total amount of monomers in monomer composition II:

from 65 to 95% by weight of monomers A, different from the monomers C and D, whose homopolymers have a glass transition temperature from 80 to 150° C.;

from 5 to 35% by weight of monomers B, different from the monomers C and D, whose homopolymers have a glass transition temperature below 0° C., from 0 to 3% by weight of at least one monomer C selected from the group consisting of ethylenically unsaturated sulfonic acids, ethylenically unsaturated phosphonic and phosphoric acids, ethylenically unsaturated carboxylic acids, ethylenically unsaturated carboxylic amides, ethylenically unsaturated carboxylic anhydrides and mixtures thereof, from 0 to 5% by weight of ethylenically unsaturated monomers D containing keto groups, and from 0 to 10% by weight of other ethylenically unsaturated monomers E, and wherein the polymer dispersion further comprises a water-soluble cross-linking component selected from polyfunctional carboxylic hydrazides and/or polyfunctional amines, where the molar ratio of hydrazide and/or amine groups to keto groups ranges from 0.5:1 to 1.5:1.

In a preferred embodiment, the first polymer phase has a glass transition temperature in the range of −15 to 5° C., preferably −10 to 0° C., and the second polymer phase has a glass transition temperature above 55° C., both as determined by differential scanning calorimetry according to ISO 16805.

In other aspects, the invention resides in coating compositions employing the aqueous polymer dispersion described herein.

DETAILED DESCRIPTION

Described herein is an aqueous polymer dispersion produced by multi-stage emulsion polymerization of at least two different monomer compositions I and II. Of these, monomer composition I comprises, inter alia, 19 to 29% by weight of hard monomers A whose homopolymers have a glass transition temperature from 80 to 150° C.; 64 to 74% by weight of soft monomers B whose homopolymers have a glass transition temperature below 0° C.; from 1 to 5% by weight of acid- or amide-functional stabilizing monomers C and from 1 to 7.5% by weight of ethylenically unsaturated monomers D containing keto groups. In contrast, monomer composition II comprises, inter alia, 65 to 95% by weight of hard monomers A and 5 to 35% by weight of soft monomers B, with the weight ratio of monomer composition I to monomer composition II ranging from 50:50 to 65:35. Monomer composition I is polymerized in a first stage to produce a first polymer phase, while monomer composition II is polymerized in a second, later stage to produce a second polymer phase. The resultant polymer dispersion also includes a water-soluble cross-linking component and allows the formulation of solvent, coalescent agent, and plasticizer-free coatings which form defect-free, high gloss films at application temperatures below 5° C. while maintaining a high scratch resistance, high block resistance and high solvent resistance.

Monomer Compositions

As used herein, the expression "hard monomers A" or "monomers A" denotes monomers whose corresponding homopolymers have a glass transition temperature, $T_g$, from 80 to 150° C., examples being styrene, vinyltoluene, acrylonitrile, methacrylonitrile, methyl methacrylate, cyclohexyl methacrylate, isobornyl acrylate, isobornyl methacrylate and mixtures thereof. Preferred hard monomers A are styrene and esters of (meth)acrylic acid. In some embodiments, the polymer dispersion comprises at least 25% by weight, more preferably at least 35% by weight, styrene based on the total amount of hard monomers A. In general, the hard monomers A and the soft monomers B are different from monomers C and D which are defined hereafter.

The $T_g$ values for the homopolymers of the majority of monomers are known and are listed for example in Ullmann's Encyclopedia of Industrial Chemistry, volume A21, page 169, 5th edition, VCH Weinheim, 1992.

The hard monomers A are present in monomer composition I in a range of from 19 to 29% by weight, and more preferably from 20 to 26% by weight, based on the total weight of monomers in monomer composition I. Monomers A are present in monomer composition II in a range of from 65 to 95% by weight, and more preferably, from 70 to 85% by weight, based on the weight of the overall amount of monomers in monomer composition II. In the monomer composition I, it is preferred to employ at least 50% by weight, preferably at least 60% by weight, of styrene based on the overall amount of hard monomers A.

The expression "soft monomers B" or "monomers B" denotes monomers whose corresponding homopolymers have a glass transition temperature below 0° C., preferably below −10° C., and more preferably below −15° C. Preferably, esters of acrylic and methacrylic acid are used. Examples include ethyl acrylate, n-butyl acrylate, n-octyl acrylate, 2-octyl acrylate, 2-ethylhexyl acrylate, 2-ethylhexyl methacrylate, lauryl acrylate, isodecyl methacrylate, lauryl methacrylate, tridecyl acrylate and mixtures thereof. Preferably, n-butyl acrylate, 2-octyl acrylate, 2-ethylhexyl acrylate and mixtures thereof are used.

The soft monomers B are present in monomer composition I in a range of from 64 to 74% by weight, and more preferably, from 67 to 73% by weight, based on the total weight of monomers in monomer composition I. Monomers B are present in monomer composition II in a range of from 5 to 35% by weight, and more preferably, from 15 to 30% by weight, based on the weight of the overall amount of monomers in monomer composition II.

It is to be appreciated that the hard monomers A and soft monomers B present in monomer composition I may be the same as, or different from, the hard monomers A and soft monomers B present in monomer composition II.

In addition to the hard monomers A and soft monomers B, the monomer composition I comprises from 1 to 5% by weight, preferably from 1.5 to 4% by weight, based on the total weight of monomers in monomer composition I of one or more monomers selected from the group consisting of ethylenically unsaturated sulfonic acids, ethylenically unsaturated phosphonic and phosphoric acids, ethylenically unsaturated carboxylic acids, ethylenically unsaturated carboxylic amides, ethylenically unsaturated carboxylic anhydrides and mixtures thereof (monomers C). In addition, although optional, the monomer composition II may comprise from 0 to 3% by weight, preferably from 0.5 to 3% by weight, based on the total weight of monomers in monomer composition II of one or more monomers C.

For example, the stabilizing monomer C may comprise an ethylenically unsaturated $C_3$-$C_8$ monocarboxylic acid and/or an ethylenically unsaturated $C_4$-$C_8$ dicarboxylic acid, together with the anhydrides or amides thereof. Examples of suitable ethylenically unsaturated $C_3$-$C_8$ monocarboxylic acids include acrylic acid, methacrylic acid and crotonic acid. Examples of suitable ethylenically unsaturated $C_4$-$C_8$ dicarboxylic acids include maleic acid, fumaric acid, itaconic acid and citraconic acid.

Examples of suitable ethylenically unsaturated sulfonic acids include those having 2-8 carbon atoms, such as vinylsulfonic acid, 2-acrylamido-2-methylpropanesulfonic acid, 2-acryloyloxyethanesulfonic acid and 2-methacryloyloxyethanesulfonic acid, 2-acryloyloxy- and 3-methacryloyloxypropanesulfonic acid. Examples of suitable ethylenically unsaturated phosphonic or phosphoric acids include vinylphosphonic acid, esters of phosphonic or phosphoric acid with hydroxyalkyl(meth)acrylates and ethylenically unsaturated polyethoxyalkyletherphosphates.

In addition to or instead of the above acids, it is also possible to use the salts thereof, preferably the alkali metal or ammonium salts thereof, particularly preferably the sodium salts thereof, such as, for example, the sodium salts of vinylsulfonic acid and of 2-acrylamidopropanesulfonic acid.

Preferable stabilizing monomers C are acrylic acid, methacrylic acid, acrylamide, and methacrylamide, and mixtures thereof.

The monomer composition I further comprises from 1 to 7.5% by weight, preferably from 2 to 5% by weight, based on the total weight of monomers in monomer composition I of one or more ethylenically unsaturated monomers D containing keto groups. Similarly, ethylenically unsaturated monomers D containing keto groups may be present in monomer composition II, such as in an amount from 0 to 5% by weight, preferably 0.5 to 4% by weight, based on the total weight of monomers in monomer composition II. Examples of such suitable co-monomers D include polymerizable derivatives of diacetone, for example diacetone acrylamide (DAAM) and diacetone methacrylamide, butanonemethacrylic esters, polymerizable 1,3-dicarbonyl compounds, for example acetoacetoxyethyl acrylate, acetoacetoxyethyl methacrylate (AAEM), acetoacetoxypropyl methacrylate, acetoacetoxybutyl methacrylate, 2,3-di(acetoacetoxy)propyl methacrylate and allyl acetoacetate, and polymerizable 1,3-diketoamides such as those compounds described in U.S. Pat. No. 5,889,098, which patent is incorporated herein by reference. Examples of suitable 1,3-diketoamides include amido acetoacetonates such as 3-isopropenyl-α,α-dimethylbenzyl amidoacetoacetate, 4-isopropenyl-α,α-dimethylbenzyl amidoacetoacetate, 4-ethylenyl-phenyl amidoacetoacetate and the like. In some embodiments, the amount of monomer D in monomer composition I, based on the total amount of monomers in monomer composition I, is larger than the amount of monomer D in monomer composition II, based on the total amount of monomers in monomer composition II.

In addition to the monomers A to D listed above, each of the monomer compositions I and II may also include up to 10% by weight, such as from 0.5 to 5% by weight, based on the total amount of monomers in the relevant monomer composition of one or more further ethylenic ally unsaturated monomers E different from monomers A to D. Generally, the total percentages of the comonomers A to E, and in some embodiments the total percentages of the comonomers A to D, add up to 100% of each of monomer compositions I and II.

Suitable monomers E include (ii) unsaturated silane co-monomers, (iii) glycidyl co-monomers, (iv) ureido co-monomers, (iv) polyfunctional co-monomers and combinations of these auxiliary optional co-monomers.

Unsaturated silanes useful as optional co-monomers E can generally correspond to a substituted silane of the structural Formula I:

Formula I in which R denotes an organic radical olefinically unsaturated in the ω-position and $R^1$ $R^2$ and $R^3$ which may be identical or different, denote the group —OZ, Z denoting hydrogen or primary or secondary alkyl or acyl radicals optionally substituted by alkoxy groups. Suitable unsaturated silane compounds of Formula I are preferably those in which the radical R in the formula represents an ω-unsaturated alkenyl of 2 to 10 carbon atoms, particularly of 2 to 4 carbon atoms, or an ω-unsaturated carboxylic acid ester formed from unsaturated carboxylic acids of up to 4 carbon atoms and alcohols of up to 6 carbon atoms carrying the Si group. Suitable radicals $R^1$, $R^2$, $R^3$ are preferably the group —OZ, Z representing primary and/or secondary alkyl radicals of up to 10 carbon atoms, preferably up to 4 carbon atoms, or alkyl radicals substituted by alkoxy groups, preferably of up to 3 carbon atoms, or acyl radicals of up to 6 carbon atoms, preferably of up to 3 carbon atoms, or hydrogen. Most preferred unsaturated silane co-monomers are vinyl trialkoxy silanes.

Examples of preferred silane compounds of the Formula I include γ-methacryloxypropyltris(2-methoxyethoxy)silane, vinyltrimethoxysilane, vinyltriethoxysilane, vinyldiethoxysilanol, vinylethoxysilanediol, allyltriethoxysilane, vinyltripropoxysilane, vinyltriisopropoxysilane, vinyltributoxysilane, vinyltriacetoxysilane, trimethylglycolvinylsilane, γ-methacryloxypropyltrimethylglycolsilane, γ-acryloxypropyltriethoxysilane and γ-methacryloxypropyltrimethoxysilane.

Glycidyl compounds can also be used as optional co-monomers E to impart epoxy-functionality to the copolymer dispersion. Examples of suitable glycidyl optional co-monomers include glycidyl acrylate, glycidyl methacrylate, allyl glycidyl ether, and vinyl glycidyl ether.

Another type of optional co-monomer E comprises cyclic ureido co-monomers. Cyclic ureido co-monomers are known to impart improved wet adhesion properties to films and coatings formed from copolymers containing these co-monomers. Cyclic ureido compounds and their use as wet adhesion promoting co-monomers are disclosed in U.S. Pat. Nos. 4,104,220; 4,111,877; 4,219,454; 4,319,032; 4,599,417 and 5,208,285. The disclosures of all of these U.S. patents are incorporated herein by reference in their entirety.

Another type of optional co-monomer E comprises monomers with at least two non-conjugated ethylenically unsaturated groups. Such cross-linking co-monomers include triallyl cyanurate, triallyl isocyanurate, diallyl maleate, diallyl fumarate, divinyl benzene, diallyl phthalate, allylmethacrylate, hexanediol diacrylate, ethyleneglycol dimethacrylate, and polyethylene glycol diacrylate.

Examples of other suitable monomers E include monomers whose homopolymers have a glass transition temperature between 0 and 79° C. selected from the group of (meth)acrylic acid esters, vinyl esters of alkanoic acids, vinyl esters of aromatic acids, olefins, dienes, vinylaromatics, and vinylhalogenides.

The relative amounts of monomers A to D, and where present monomer E, in monomer composition I are controlled within the above ranges. In some embodiments, the monomers A to D, and where present monomer E, are controlled such that, when polymerized according to the process described below, the monomer composition I produces a first polymer phase having a glass transition temperature in the range of −15 to 5° C., preferably −10 to 0° C., as determined by differential scanning calorimetry according to ISO 16805.

In the case of monomer composition II, the relative amounts of monomers A and B, and where present monomers C to E, are in some embodiments controlled within the ranges given above and such that, when polymerized according to the process described below, the monomer composition II produces a second polymer phase having a glass transition above 55° C., preferably at least 65° C. as determined by differential scanning calorimetry according to ISO 16805.

The weight ratio of monomer composition I to monomer composition II used to produce the polymer dispersion described herein ranges from 50:50 to 65:35, preferably from 55:45 to 60:40.

Stabilization System

Both during polymerization and thereafter, the multistage polymer described herein is stabilized in the form of an aqueous copolymer dispersion or latex. The copolymer dispersion is therefore prepared in the presence of and subsequently contains a stabilization system which generally comprises emulsifiers, in particular nonionic emulsifiers and/or anionic emulsifiers and/or protective colloids. Mixtures of the different stabilizers can also be employed.

The amount of emulsifier employed will generally be at least 0.5 wt. %, based on the total quantity of monomers in the copolymer dispersion. Generally emulsifiers can be used in amounts up to about 8 wt. %, based on the total quantity of monomers in the copolymer dispersion. Emulsifiers employed with preference herein are nonionic emulsifiers having alkylene oxide groups and/or anionic emulsifiers having sulfate, sulfonate, phosphate and/or phosphonate groups. Such emulsifiers, if desired, can be used together with molecularly or dispersely water-soluble polymers. Preferably also the emulsifiers used contain no alkylphenolethoxylate (APEO) structural units.

Examples of suitable nonionic emulsifiers include acyl, alkyl, oleyl, and alkylaryl ethoxylates. These products are commercially available, for example, under the name Genapol®, Lutensol® or Emulan®. They include, for example, ethoxylated mono-, di-, and tri-alkylphenols (EO degree: 3 to 50, alkyl substituent radical: $C_4$ to $C_{12}$) and also ethoxylated fatty alcohols (EO degree: 3 to 80; alkyl radical: $C_8$ to $C_{36}$), especially $C_{10}$-$C_{14}$ fatty alcohol (3-40) ethoxylates, $C_{11}$-$C_{15}$ oxo-process alcohol (3-40) ethoxylates, $C_{16}$-$C_{18}$ fatty alcohol (11-80) ethoxylates, $C_{11}$ oxo-process alcohol (3-40) ethoxylates, $C_{13}$ oxo-process alcohol (3-40) ethoxylates, polyoxyethylenesorbitan monooleate with 20 ethylene oxide groups, copolymers of ethylene oxide and propylene oxide having a minimum ethylene oxide content of 10% by weight, the polyethylene oxide (4-40) ethers of oleyl alcohol, and the polyethene oxide (4-40) ethers of nonylphenol. Particularly suitable are the polyethylene oxide (4-40) ethers of fatty alcohols, more particularly of oleyl alcohol, stearyl alcohol or $C_{11}$ alkyl alcohols.

The amount of nonionic emulsifiers used in preparing the copolymer dispersions herein is typically up to about 8% by weight, preferably up to about 5% by weight, more preferably up to about 3% by weight, based on the total monomer quantity. Mixtures of nonionic emulsifiers can also be employed.

Examples of suitable anionic emulsifiers include sodium, potassium, and ammonium salts of linear aliphatic carboxylic acids of chain length $C_{12}$-$C_{20}$, sodium hydroxyoctadecanesulfonate, sodium, potassium, and ammonium salts of hydroxy fatty acids of chain length $C_{12}$-$C_{20}$ and their sulfonation and/or sulfation and/or acetylation products, alkyl sulfates, including those in the form of triethanolamine salts, alkyl($C_{10}$-$C_{20}$) sulfonates, alkyl($C_{10}$-$C_{20}$) arylsulfonates, and their sulfonation products, lignosulfonic acid and its calcium, magnesium, sodium, and ammonium salts, resin acids, hydrogenated and dehydrogenated resin acids, and their alkali metal salts, dodecylated sodium diphenyl ether disulfonate, sodium alkyl sulfate, sulfated alkyl or aryl ethoxylate with EO degree between 1 and 30, for example ethoxylated sodium lauryl ether sulfate or a salt of a bisester, preferably of a bis-$C_4$-$C_{18}$ alkyl ester, of a sulfonated dicarboxylic acid having 4 to 8 carbon atoms, or a mixture of these salts, preferably sulfonated salts of esters of succinic acid, more preferably salts, such as alkali metal salts, of bis-$C_4$-$C_{18}$ alkyl esters of sulfonated succinic acid, or phosphates of polyethoxylated alkanols. Particularly suitable are sodium or potassium alkyl sulfates such as sodium lauryl sulfate, and sodium, potassium or ammonium salts of sulfated $C_{10}$-$C_{16}$ alkyl ethoxylates with an EO degree between 1 and 30.

The amount of anionic emulsifiers used can typically range from about 0.1% to about 3.0% by weight, preferably from about 0.1% to about 2.0% by weight, more preferably from about 0.5% to about 1.5% by weight, based on the total monomer quantity. Mixtures of anionic emulsifiers can also be employed.

Also suitable as stabilizers for the present dispersions are copolymerizable nonionic and anionic surfactants such as those disclosed in US 2014/0243552. Other suitable copolymerizable surfactants are sold under the trade names Hitenol® BC, Hitenol® KH, Hitenol® AR, Adeka Reasoap SR, and Adeka Reasoap ER.

Along with emulsifiers, the aqueous copolymer dispersions employed in accordance with the present development may also comprise as part of the stabilizer system a selected type of protective colloid based on cellulose ethers, poly vinyl alcohol, poly vinyl pyrolidone, polyacrylic acid, maleic acid styrene copolymers or other water soluble polymers. Suitable protective colloids used in the copolymer dispersions herein include water-soluble or water-dispersible polymeric modified natural substances based on cellulose ethers. Such cellulose ethers have a viscosity, when tested as a 1 wt. % aqueous in water at 25° C., of 5 to 5,000 mPas, preferably of 10 to about 1,500 mPas, more preferably 10 to 500 mPas. Mixtures of celluloses ethers may be used to achieve these viscosity values. Examples of suitable cellulose ether materials include methyl cellulose, hydroxyethyl cellulose, hydroxypropyl cellulose, hydroxypropyl methyl cellulose, ethyl hydroxyethyl cellulose, methyl hydroxyethyl cellulose and combinations of these cellulose ethers. Carboxymethyl cellulose (CMC) is most preferred, as described in U.S. Pat. No. 4,492,780.

Hydrophobically modified cellulose ethers may also be employed as the protective colloid in the copolymer dispersions herein. Such materials comprise cellulose ethers which have been hydrophobically modified with long chain hydrocarbon groups to reduce their water solubility. Hydrophobically modified cellulose ethers of this type are those described, for example, in U.S. Pat. Nos. 4,228,277; 4,352,916 and 4,684,704; all of which patents are incorporated herein by reference.

The protective colloids can be used individually or in combination. In the case of combinations, the two or more colloids can each differ in their molecular weights or they can differ in their molecular weights and in their chemical composition, such as the degree of hydrolysis, for example.

When protective colloids are used, the amount thereof, based on the total amount of monomers used, is typically from 0.1 to 5 parts by weight, preferably from 0.3 to 5 parts by weight.

In a preferred variant, the present dispersions contain no protective colloid at all, or the amount of protective colloid, based on the total amount of monomers used, is less than 1% by weight, more preferably less than 0.5% by weight.

In a particularly preferred variant, the present dispersions neither contain protective colloids nor nonionic emulsifiers.

In addition to the emulsifiers and protective colloids that are used during the emulsion polymerization of the copolymers herein, it is also possible to add further emulsifiers, protective colloids and/or other stabilizers after the polymerization.

Production of the Copolymer Dispersion

The desired copolymer dispersion is produced by multistage emulsion polymerization of the monomers and stabilizing system described above in an aqueous medium and in the presence of one or more free radical initiators. Suitable free radical initiators include hydrogen peroxide, benzoyl peroxide, cyclohexanone peroxide, isopropyl cumyl hydroperoxide, persulfates of potassium, of sodium and of ammonium, peroxides of saturated monobasic aliphatic carboxylic acids having an even number of carbon atoms and a $C_8$-$C_{12}$ chain length, tert-butyl hydroperoxide, di-tert-butyl peroxide, diisopropyl percarbonate, azoisobutyronitrile, acetylcyclohexanesulfonyl peroxide, tert-butyl perbenzoate, tert-butyl peroctanoate, bis(3,5,5-trimethyl)hexanoyl peroxide, tert-butyl perpivalate, hydroperoxypinane, p-methane hydroperoxide. The abovementioned compounds can also be used within redox systems, using transition metal salts, such as iron(II) salts, or other reducing agents. Alkali metal salts of oxymethanesulfinic acid, hydroxylamine salts, sodium dialkyldithiocarbamate, sodium bisulfite, ammonium bisulfite, sodium dithionite, diisopropyl xanthogen disulfide, ascorbic acid, tartaric acid, and isoascorbic acid can also be used as reducing agents.

The multi-stage emulsion polymerization may be carried out in accordance with the customary techniques of emulsion polymerization. Preferably, the process is carried out by first emulsifying and then polymerizing in a first stage the monomer composition I in an aqueous phase in the presence of emulsifiers, initiators and, if desired, protective colloids, at suitable temperatures of, for example from 50 to 95° C., preferably 65 to 90° C., to produce a first polymer phase. Subsequently, the monomer composition II is polymerized in a second stage in the aqueous phase in the presence of the polymerized composition I as well as emulsifiers, initiators and, if desired, protective colloids, at suitable temperatures of, for example, from 50 to 95° C., preferably 65 to 90° C., to produce the second polymer phase and thereby to obtain polymer particles comprising the first and second polymer phase. A variety of particle morphologies may be obtained, ranging from core-shell to Janus and raspberry structures. In case of a core-shell morphology, the first polymer phase does not necessarily correspond to the core phase of the polymer particle.

In some embodiments, it may be desirable to pre-polymerize a small amount (less than 10 weight %) of the monomer composition I or II to produce an in-situ seed before the remaining amounts of the monomer composition I and the monomer composition II are sequentially metered into the reactor to form the final polymer dispersion.

Preferably, the polymerization is conducted in the presence of less than 0.05% by weight, based on the total weight of the monomers in monomer mixtures I and II, of a chain transfer agent (CTA), more preferably in the absence of chain transfer agents to obtain polymers with a high weight average molecular weight >20,000 g/mol, preferably >50,000 g/mol, most preferably >100,000 g/mol, as measured by gel permeation chromatography. The high molecular weight of the polymer further enhances the scratch and block resistance of coatings using the present polymer dispersion.

On completion of the polymerization, a further, preferably chemical after-treatment, especially with redox catalysts, for example combinations of the above-mentioned oxidizing agents and reducing agents, may follow to reduce the level of residual unreacted monomer on the product. In addition, residual monomer can be removed in known manner, for example by physical demonomerization, i.e. distillative removal, especially by means of steam distillation, or by stripping with an inert gas. A particularly efficient combination is one of physical and chemical methods, which permits lowering of the residual monomers to very low contents (<1000 ppm, preferably <100 ppm).

The polymerized particles produced by the present process typically have a weight-averaged diameter of less than 150 nm, preferably less than 120 nm, as measured by a combination of laser diffraction and polarization intensity differential scattering (PIDS) using a Beckman Coulter LS 13320 Particle Size Analyzer.

In addition to monomers described herein, the final polymer also contains a water-soluble cross-linking agent, which is preferably added after polymerization of the monomer composition I and II. Such a cross-linking agent will react with specific polymer functionalities, such as keto groups from the monomers D, as water is removed from the coating compositions herein and as a film or coating is formed from the polymerized components.

Suitable water-soluble cross-linking agents that can be used in the compositions herein comprise polyfunctional carboxylic hydrazides and/or polyfunctional amines, where the molar ratio of hydrazide and/or amine groups to keto groups in the polymer dispersion ranges from 0.5:1 to 1.5:1.

Examples of suitable polyfunctional carboxylic hydrazides are dihydrazide compounds of aliphatic dicarboxylic acids of 2 to 10, in particular 4 to 6, carbon atoms, e.g., oxalic acid dihydrazide, malonic acid dihydrazide, succinic acid dihydrazide, glutaric acid dihydrazide, adipic acid dihydrazide, sebacic acid dihydrazide, maleic acid dihydrazide, fumaric acid dihydrazide and/or itaconic acid dihydrazide. Water-soluble aliphatic dihydrazines of 2 to 4 carbon atoms, e.g., ethylene-1,2-dihydrazine, propylene-1,3-dihydrazine or butylene-1,4-dihydrazine, are also suitable. Adipic acid dihydrazide (ADH) is a preferred water-soluble cross-linking agent for use in the compositions herein, especially those produced from monomer compositions in which the monomer D comprises diacetone acrylamide (DAAM).

Examples of suitable polyfunctional amines include ethylene diamine and hexamethylene diamine Such cross-linking agents are preferred in combination with polymers in which the monomer D comprises 1,3-dicarbonyl groups, such as acetoacetoxyethyl methacrylate (AAEM).

After polymerization the dispersion is typically neutralized to alkaline pH. This can be accomplished by, for example, the addition of an organic or inorganic base, such as an amine, ammonia or an alkali metal hydroxide, such as sodium or potassium hydroxide. In some embodiments, it is preferred to effect neutralization with a nitrogen-free base.

The aqueous polymer dispersions produced by the process of the invention generally have a solids content of from 30 to 70% by weight, preferably from 40 to 55% by weight.

Coating/Paint Composition Formulation and Preparation

The aqueous polymer dispersions described herein are stable fluid systems which can be used to produce coating compositions suitable for use as high gloss trim paints, lacquers, varnishes and wood stains. When used in paint applications, the aqueous polymer dispersions are typically combined with one or more conventional fillers and/or pigments. In this context, pigments are understood as solids which have a refractive index greater than or equal to 1.75, whereas fillers are understood as meaning solids which have a refractive index of less than 1.75.

Preferred fillers useful in the paint compositions herein can be, for example, calcium carbonate, magnesite, dolomite, kaolin, mica, talc, silica, calcium sulfate, feldspar, barium sulfate and opaque polymers. Examples of white pigments useful in the paint compositions herein can be zinc oxide, zinc sulfide, basic lead carbonate, antimony trioxide, lithopone (zinc sulfide+barium sulfate) and, preferably, titanium dioxide. Examples of inorganic colored pigments which may preferably be used in the paint compositions herein include iron oxides, carbon black, graphite, luminescent pigments, zinc yellow, zinc green, Paris blue, ultramarine, manganese black, antimony black, manganese violet, bismuth vanadate or Schweinfurt green. Suitable organic colored pigments preferably are, for example, sepia, gamboge, Cassel brown, toluidine red, para red, Hansa yellow, indigo, azo dyes, anthraquinone and indigo dyes as well as dioxazine, quinacridone, phthalocyanin, isoindolinone and metal complex pigments of the azomethine series.

The fillers may be used as individual components. Mixtures of fillers such as, for example, calcium carbonate/kaolin and calcium carbonate/kaolin/talc have also been found to be particularly useful in practice. To increase the hiding power of the coating and to save on titanium dioxide, finely divided fillers such as, for example, finely divided calcium carbonate and mixtures of various calcium carbonates with different particle size distribution are frequently used. To adjust the hiding power, the shade and the depth of color of the coatings formed, the fillers are mixed with appropriate amounts of white pigment and inorganic and/or organic colored pigments.

To disperse the fillers and pigments in water, auxiliaries based on anionic or nonionic wetting agents, such as preferably, for example, sodium pyrophosphate, sodium polyphosphate, naphthalenesulfonate, sodium polyacrylate, sodium polymaleinates and polyphosphonates such as sodium 1-hydroxyethane-1,1-diphosphonate and sodium nitrilotris(methylenephosphonate), may be added.

Thickeners may also be added to the paint formulations herein. Thickeners which may be used include, inter alia, sodium polyacrylate and water-soluble copolymers based on acrylic and methacrylic acid, such as acrylic acid/acrylamide and methacrylic acid/acrylic ester copolymers. Hydrophobically-modified alkali soluble (acrylic) emulsions (HASE), hydrophobically-modified ethoxylate (poly)urethanes (HEUR), hydrophobically-modified ethoxylate (poly)urethane alkali-swellable/soluble emulsions (HEURASE), polyether polyols (PEPO), and polyurea thickeners are also available. Inorganic thickeners, such as, for example, bentonites or hectorite, may also be used.

For various applications, it is sometimes also desirable to include small amounts of other additives, such as biocides, pH modifiers, and antifoamers, incorporated in the latex paint compositions herein. This may be done in a conventional manner and at any convenient point in the preparation of the latexes.

The aqueous copolymer dispersion described herein is particularly useful as binder for waterborne high-gloss coating compositions with low emission regarding Total Volatile Organic Compound (TVOC) and Total Semi Volatile Organic Compound (TsVOC) contents. A volatile organic compound is defined herein as a carbon containing compound that has a boiling point below 250° C. at atmospheric pressure (as defined in the Commission Decision 2014/312/EU). The TVOC content may be determined by gas chromatography according to ISO 11890-2, or alternatively for products with a VOC content of less than 1.0 g/L according to ISO 17895. sVOC compounds have a boiling point above 250° C. (as defined in detail in the Commission Decision 2014/312/EU) and may be determined by gas chromatography according to ISO 11890-2.

Main contributors to VOC/sVOC are coalescent agents which reduce the MFFT, such as butyl glycol, butyl diglycol, butyl diglycol acetate, 1-methoxy-2-propanol, 3-methoxy-1-butanol, texanol, ethyl diglycol, dipropylene glycol monomethyl ether, and dipropylene glycol n-butyl ether, and plasticizers, which increase the elasticity of the coating, such as 2,2,4-trimethyl-1,3-pentanediol diisobutyrate (TXIB), hexylene glycol, triethylene glycol-bis-2-ethylhexanoate (3G8), Loxanol® PL 3060, and Benzoflex™. Further VOC sources may include co-solvents, including glycols, which help with wet edge application, open time, and freeze-thaw resistance, emulsion components and most additives at low levels. For instance, amino methyl propanol is a volatile compound used to adjust pH.

Commercially available waterborne high-gloss coating compositions may have VOC levels up to or exceeding 130 g/L. In contrast, coating compositions based on the polymer dispersions described herein can have a very low volatile organic content (VOC), such as less than 30 g/L, preferably less than 5 g/L, most preferably less than 1 g/L.

Coating/Paint Composition Performance

When used in a coating composition, such as a high gloss trim paint, lacquer, stain, or varnish, the polymer dispersion described herein forms a film or coating which, upon curing, will adhere to a substrate onto which the trim paint has been applied. The coating composition seals and protects the substrate.

The minimum temperature required for the polymer dispersion or coating composition to form a film is referred to as the minimum film forming temperature or MFFT (DIN ISO 2115). The MFFT is related to the glass transition temperature, $T_g$, of the polymer dispersion. The polymer dispersion herein will have a MFFT of less than 5° C., preferably less than 1° C. In a preferred embodiment, a coating composition which is produced from the present polymer dispersion and which does not contain any organic solvent, plasticizer or coalescent agent, may form a defect-free film at a coating temperature below 5° C. at a wet coating thickness up to 1 mm.

As noted above, another important performance property of the coating compositions described herein is the ability to produce a high gloss film. In particular, a coating composition produced from the present polymer dispersion may produce a film having more than 20 gloss units, preferably more than 40 gloss units, most preferably more than 60 gloss units, when measured with a glossmeter at an angle of 60° according to ASTM D523.

The invention will now be more particularly described with reference to the following non-limiting Examples.

Example 1

A 3 liter reactor equipped with a reflux condenser and an anchor stirrer was filled with 660 g of deionized (DI) water and 20 g of a 28% aqueous solution of a sodium $C_{11}$-alkyl ether sulfate with approx. 7 ethylene oxide units. The reactor content was heated to 80° C. and 4% of monomer feed 1 was added. Monomer feeds 1 and 2 were obtained by mixing the ingredients in Table 1 under stirring. A solution of 0.6 g ammonium persulfate in 11 g of water was added and the reactor contents were held at 80° C. for 15 min. Subsequently, the remaining amount of monomer feed 1 was added to the reactor with a constant dosage rate over 105 min. After completion of monomer feed 1, monomer feed 2 was added to the reactor with a constant dosage rate over 75 min. The reactor temperature was maintained at 80° C. during the feed additions. After completion of the feed additions, the reactor content was held at 80° C. for another 60 minutes and then cooled to room temperature. 18 g of a 12.5 wt % solution of ammonium hydroxide in water were added during this post-heating time. At room temperature, 201 g of an 8 wt % solution of adipic acid dihydrazide in water were added to the dispersion.

The properties of the resulting polymer dispersion are summarized in Table 3.

Examples 2-4 (Comparative)

The process of Example 1 was repeated with varying monomer feed compositions, as described in Table 1. The post addition of 201 g of an 8 wt % aqueous solution of adipic acid dihydrazide was omitted for Example 4.

The properties of the resulting polymer dispersions are summarized in Table 3

Example 5 (Inventive)

The process of Example 1 was repeated with varying monomer feed compositions, as described in Table 2.

The properties of the resulting polymer dispersion are summarized in Table 3.

Examples 6-8 (Comparative)

The process of Example 1 was repeated with varying monomer feed compositions, as described in Table 2. The post addition of 201 g of an 8 wt % aqueous solution of adipic acid dihydrazide was omitted for Example 8.

The properties of the resulting polymer dispersions are summarized in Table 3.

TABLE 1

Composition of the monomer feeds of Ex. 1-4 (in grams)

| | Ex. 1 | Ex. 2 | Ex. 3 | Ex. 4 |
|---|---|---|---|---|
| Monomer feed 1 | | | | |
| DI water | 307 | 307 | 307 | 307 |
| Sodium $C_{11}$-alkyl ether sulfate, 28% in water | 22 | 22 | 22 | 22 |
| Ammonium persulfate | 2.2 | 2.2 | 2.2 | 2.2 |
| Methacrylic acid (MAA) | 25 | 25 | 25 | 25 |
| Styrene | 125 | 38 | 176 | 125 |
| Methyl methacrylate (MMA) | 25 | 25 | 50 | 25 |
| n-Butyl acrylate (BA) | 477 | 564 | 401 | 477 |
| Diacetone acrylamide | 25 | 25 | 25 | 0 |
| Monomer feed 2 | | | | |
| DI water | 225 | 225 | 225 | 225 |
| Sodium $C_{11}$-alkyl ether sulfate, 28% in water | 17 | 17 | 17 | 17 |
| Ammonium persulfate | 1.7 | 1.7 | 1.7 | 1.7 |
| Methacrylic acid (MAA) | 7 | 7 | 7 | 7 |
| Styrene | 166 | 166 | 166 | 166 |
| Methyl methacrylate (MMA) | 270 | 270 | 270 | 270 |
| n-Butyl acrylate (BA) | 38 | 38 | 38 | 38 |
| Diacetone acrylamide | 7 | 7 | 7 | 0 |

TABLE 2

Composition of the monomer feeds of Ex. 5-8 (in grams)

| | Ex. 5 | Ex. 6 | Ex. 7 | Ex. 8 |
|---|---|---|---|---|
| Monomer feed 1 | | | | |
| DI water | 307 | 307 | 307 | 307 |
| Sodium $C_{11}$-alkyl ether sulfate, 28% in water | 22 | 22 | 22 | 22 |
| Ammonium persulfate | 2.2 | 2.2 | 2.2 | 2.2 |
| Methacrylic acid (MAA) | 16 | 16 | 16 | 16 |
| Styrene | 113 | 38 | 207 | 113 |
| Methyl methacrylate (MMA) | 78 | 25 | 107 | 78 |
| n-Butyl acrylate (BA) | 218 | 282 | 157 | 218 |
| 2-Ethylhexyl acrylate (EHA) | 218 | 282 | 157 | 218 |
| Diacetone acrylamide | 25 | 25 | 25 | 0 |
| Monomer feed 2 | | | | |
| DI water | 225 | 225 | 225 | 225 |
| Sodium $C_{11}$-alkyl ether sulfate, 28% in water | 17 | 17 | 17 | 17 |
| Ammonium persulfate | 1.7 | 1.7 | 1.7 | 1.7 |
| Methacrylic acid (MAA) | 2 | 2 | 2 | 2 |
| Styrene | 114 | 114 | 114 | 114 |
| Methyl methacrylate (MMA) | 312 | 312 | 312 | 312 |
| n-Butyl acrylate (BA) | 47 | 47 | 47 | 47 |
| Diacetone acrylamide | 7 | 7 | 7 | 0 |

TABLE 3

Properties of the polymer dispersions

| | Solid content (%)[1] | Brookfield viscosity (mPa s)[2] | pH | $d_w$ (nm)[3] | $T_{g,1}$ (° C.)[4] | $T_{g,2}$ (° C.)[4] | MFFT (° C.)[5] |
|---|---|---|---|---|---|---|---|
| Example 1 | 44.7 | 452 | 7.6 | 90 | −3.6 | 81.0 | 0 |
| Example 2 | 44.8 | 344 | 7.5 | 100 | −23.9 | 80.5 | 0 |
| Example 3 | 44.7 | 334 | 7.6 | 90 | 13.6 | 80.6 | 7 |
| Example 4 | 46.5 | 1706 | 7.5 | 90 | −8.2 | 75.9 | 0 |
| Example 5 | 44.6 | 286 | 7.9 | 90 | −7.8 | 73.9 | 0 |
| Example 6 | 44.5 | 334 | 7.9 | 90 | −39.5 | 72.7 | 0 |
| Example 7 | 44.6 | 152 | 8.0 | 90 | 21.4 | 75.5 | 30 |
| Example 8 | 46.1 | 1302 | 8.1 | 90 | −10.7 | 70.8 | 0 |

[1] gravimetric determination after 24 h drying at 110° C.
[2] measurement conditions: 20° C., 20 rpm, spindle 2
[3] weight-average particle diameter as determined by a Beckman Coulter LS 13320 Particle Size Analyzer
[4] Glass transition temperature as measured by differential scanning calorimetry (DSC) according to ISO 16805. $T_{g,1}$ denotes the glass transition temperature of the soft polymer phase 1; $T_{g,2}$ denotes the glass transition temperature of the hard polymer phase 2.
[5] The minimum film forming temperature (MFFT) is defined as the lowest temperature at which a polymer dispersion coalesces when laid on a substrate as a thin film, thereby forming clear transparent film.

Examples 9-16 (Inventive and Comparative White Lacquers)

Coalescent- and solvent free high gloss white lacquers were prepared by mixing the ingredients in Table 4 at room temperature under stirring. After dissolving and dispersing pos. 2-5, titanium dioxide as per pos. 6 was dispersed consecutively by increasing the dissolver speed to 5000 rpm. After the preparation of the mill base, pos. 7-9 were added while gently stirring. The solid contents of all polymer dispersions were adjusted to 44% before their addition. The resulting lacquers had a solid content of approx. 50.6% and their pigment volume concentration (p.v.c.) was approx. 17.

TABLE 4

Composition of high gloss white lacquers

| Pos. | | Supplier | Description | Parts per weight |
|---|---|---|---|---|
| 1 | Water | | | 64 |
| 2 | Lopon ® 890 | ICL | Dispersing agent | 10 |
| 3 | Mowilith ® LDM 7005 | Celanese | HASE thickener | 10 |
| 4 | Byk ® 21 | Byk | Defoamer | 2 |
| 5 | Ammonium hydroxide, 25 wt % | | Base | 5 |
| 6 | Tronox ® CR 828 | Tronox | Titanium dioxide | 210 |
| 7 | Dispersion per Ex. 1-10 | | | 636 |
| 8 | Südranol ® 240 | SEC | Wax emulsion | 20 |
| 9 | Water | | | 43 |

The properties of the resulting white lacquers are displayed in Table 5 and a summary of the results are given in Table 6.

TABLE 5

Properties of the high gloss lacquers

| Ex. | Blocking (50° C., g/6.25 cm$^2$)[1] | Blocking (25° C., g/6.25 cm$^2$)[1] | Scratch resistance[2] | Solvent resistance[2] | Elongation at break (%)[3] | Gloss at 20°/60°[4] | MFFT (° C.) |
|---|---|---|---|---|---|---|---|
| 9 | 920 | 130 | 2 | 1 | 29 | 50/77 | 0 |
| 10 | 900 | 240 | 4 | 1 | 45 | 51/76 | 0 |
| 11 | 140 | 51 | 2 | 2 | 6 | 51/77 | 13 |
| 12 | 4000 | 1460 | 3 | 5 | 100 | 49/77 | 0 |
| 13 | 1000 | 160 | 2 | 1 | 31 | 48/76 | 0 |
| 14 | 1640 | 530 | 4 | 2 | 27 | 49/76 | 0 |
| 15 | did not form film at 25° C. | | | | | | 36 |
| 16 | >5000 | 4200 | 3 | 4 | 171 | 53/79 | 0 |

[1]Leneta contrast cards (75 × 25 mm) glued to wooden panels were coated at a wet film thickness of 200 μm. After drying for 24 h, two coated cards were placed on top of each other at a 90° angle with their coated sides facing each other. They were then subjected to a force of 2 kg at 50° C. (second column) or 25° C. (third column) for 1 h. Subsequently, the force required to separate the cards was determined.
[2]Films of the lacquers were cast onto a glass plate with a scraper to yield a wet film thickness of approx. 300 μm and dried at room temperature for 7 days. Scratch resistance: The lacquer was scratched with a finger nail and the alteration of the lacquer surface was evaluated; grading: 1 (no effect), 2 (light scratch mark), 3 (distinct scratch mark, low indentation depth), 4 (pronounced scratch mark, high indentation depth), 5 (very pronounced scratch mark, indentation down to substrate). Solvent resistance: a 1:1 mixture by weight of isopropanol and water is rubbed in the lacquer film with a cotton ball by 20 circular movements; grading: 1 (no to very slight effect), 2 (slight alteration of surface), 3 (distinct alteration of surface), 4 (pronounced alteration of surface), 5 (film completely destroyed).
[3]The lacquer was applied to a PE film at a wet film thickness of 300 μm. 3 free-standing films with a length of at least 100 mm and a width of 15 mm were prepared after 7 days, mounted into a tensile tester and pre-stressed with a force of 200 mN. The initial length between the clamps was 50 mm and the strain rate was 200 mm/min. Reported is the average value for the three specimens.
[4]Films of the lacquers were cast onto a glass plate with a scraper to yield a wet film thickness of approx. 300 μm and dried at room temperature for 7 days. The gloss was then measured with a glossmeter according to ASTM D523.

TABLE 6

Experimental summary

| Ex. | Dispersion | Good block resistance?[1] | Film formation below 5° C.?[2] | Good scratch resistance?[3] | Good solvent resistance?[4] | Good elasticity?[5] |
|---|---|---|---|---|---|---|
| 9 | 1 (inv.) | Yes | Yes | Yes | Yes | Yes |
| 10 | 2 (comp.) | Yes | Yes | No | Yes | Yes |
| 11 | 3 (comp.) | Yes | No | Yes | Yes | No |
| 12 | 4 (comp.) | No | Yes | No | No | Yes |
| 13 | 5 (inv.) | Yes | Yes | Yes | Yes | Yes |
| 14 | 6 (comp.) | No | Yes | No | Yes | Yes |

TABLE 6-continued

Experimental summary

| Ex. | Dispersion | Good block resistance?[1] | Film formation below 5° C.?[2] | Good scratch resistance?[3] | Good solvent resistance?[4] | Good elasticity?[5] |
|---|---|---|---|---|---|---|
| 15 | 7 (comp.) | | did not form film at 25° C. | | | |
| 16 | 8 (comp.) | No | Yes | No | No | Yes |

[1]Values below 1500 g/6.25 cm² at 50° C. and below 500 g/6.25 cm² at 25° C. indicate good block resistance.
[2]Films of the lacquers were cast onto a glass plate with a scraper to yield a wet film thickness of approx. 500 μm. Film formation took place in a chamber with a temperature of 4° C. and 50% relative humidity.
[3]Marks 2.5 or better indicate good scratch resistance.
[4]Marks 2.5 or better indicate good solvent resistance.
[5]Elongation at break above 20% indicates sufficient elasticity of the binder to be suitable for the application on wood and other substrates which are not dimensionally stable.

As can be inferred by Table 6, only coalescent-, plasticizer- and solvent-free coatings comprising the inventive dispersions perform well regarding block resistance, scratch resistance, and media resistance, while exhibiting a crack-free film formation below 5° C. and exhibiting sufficient elasticity to be suitable for the application on wood and other substrates which are not dimensionally stable.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

What is claimed is:

1. An aqueous polymer dispersion having a minimum film forming temperature (MFFT) less than 5° C., obtained by radically initiated multi-stage emulsion polymerization and comprising particles with a first polymer phase formed from a monomer composition I and a second polymer phase formed after the first polymer phase from a monomer composition II, wherein the weight ratio of monomer composition I to monomer composition II ranges from 50:50 to 65:35, wherein the monomer composition I comprises, based on the total amount of monomers in monomer composition I:

from 19 to 29% by weight of monomers A, different from monomers C and D, whose homopolymers have a glass transition temperature from 80 to 150° C.;

from 64 to 74% by weight of monomers B, different from monomers C and D, whose homopolymers have a glass transition temperature below 0° C.;

from 1 to 5% by weight of at least of the monomers C selected from the group consisting of ethylenically unsaturated sulfonic acids, ethylenically unsaturated phosphonic and phosphoric acids, ethylenically unsaturated carboxylic acids, ethylenically unsaturated carboxylic amides, ethylenically unsaturated carboxylic anhydrides and mixtures thereof;

from 1 to 7.5% by weight of ethylenically unsaturated monomers D containing keto groups; and from 0 to 10% by weight of other ethylenically unsaturated monomers E different from monomers A to D, wherein the monomer composition II comprises, based on the total amount of monomers in monomer composition II:

from 65 to 95% by weight of monomers A, different from the monomers C and D, whose homopolymers have a glass transition temperature from 80 to 150° C.;

from 5 to 35% by weight of monomers B, different from the monomers C and D, whose homopolymers have a glass transition temperature below 0° C.;

from 0 to 3% by weight of at least one the monomers C selected from the group consisting of ethylenically unsaturated sulfonic acids, ethylenically unsaturated phosphonic and phosphoric acids, ethylenically unsaturated carboxylic acids, ethylenically unsaturated carboxylic amides, ethylenically unsaturated carboxylic anhydrides and mixtures thereof;

from 0 to 5% by weight of ethylenically unsaturated monomers D containing keto groups; and from 0 to 10% by weight of other ethylenically unsaturated monomers E different from monomers A to D, and wherein the polymer dispersion further comprises a water-soluble cross-linking component selected from polyfunctional carboxylic hydrazides and/or polyfunctional amines, where the molar ratio of hydrazide and/or amine groups to keto groups ranges from 0.5:1 to 1.5:1, and wherein the first polymer phase has a glass transition temperature in the range of from −15 to 5° C., and wherein the second polymer phase has a glass transition temperature above 55° C., both as determined by differential scanning calorimetry according to ISO 16805, and the polymers obtained from polymerization of the monomer composition I and monomer composition II have a weight average molecular weight greater than 20,000 g/mol as measured by gel permeation chromatography (GPC).

2. The aqueous polymer dispersion according to claim 1, wherein the monomers A are selected from the group consisting of esters of acrylic or methacrylic acid, styrene and mixtures thereof.

3. The aqueous polymer dispersion according to claim 1, wherein the monomers B are selected from the group consisting of esters of acrylic acid and esters of methacrylic acid.

4. The aqueous polymer dispersion according to claim 1, wherein the monomers B are selected from the group consisting of n-butyl acrylate, 2-octyl acrylate, 2-ethylhexyl acrylate and mixtures thereof.

5. The aqueous polymer dispersion according to claim 1, wherein the dispersion comprises at least 25% by weight, styrene based on the total amount of monomers A.

6. The aqueous polymer dispersion according to claim 1, wherein the monomer composition II comprises, based on the total amount of monomers in monomer composition II, from 0.5 to 3% by weight of monomers C.

7. The aqueous polymer dispersion according to claim 1, wherein the amount of monomer C in monomer composition I, based on the total amount of monomers in monomer composition I, is larger than the amount of monomer C in monomer composition II, based on the total amount of monomers in monomer composition II.

8. The aqueous polymer dispersion according to claim 1, wherein the monomers C are selected from acrylic acid, methacrylic acid, acrylamide, methacrylamide, and mixtures thereof.

9. The aqueous polymer dispersion according to claim 1, wherein the monomer composition II comprises, based on the total amount of monomers in monomer composition II, from 0.5 to 4% by weight of ethylenically unsaturated monomers D containing keto groups.

10. The aqueous polymer dispersion according to claim 1, wherein the amount of monomer D in monomer composition I, based on the total amount of monomers in monomer composition I, is larger than the amount of monomer D in monomer composition II, based on the total amount of monomers in monomer composition II.

11. The aqueous polymer dispersion according to claim 1, wherein the monomer D is diacetone acrylamide and the polyfunctional carboxylic hydrazide is adipic dihydrazide.

12. The aqueous polymer dispersion according to claim 1, wherein the monomer D is 2-acetoacetoxymethacrylate and the cross-linking component is selected from one or more polyfunctional amines.

13. A process for preparing the aqueous polymer dispersion according to claim 1 by multi-stage emulsion polymerization, wherein each of the monomer compositions I and II is emulsified and polymerized in aqueous phase in the presence of emulsifiers, initiators and optionally protective colloids at a polymerization temperature ranging from 50 to 95° C.

14. The process according to claim 13, wherein part of either monomer composition I or II is prepolymerized before the remaining parts of monomer compositions I and II are supplied to the multi-stage emulsion polymerization.

15. The process according to claim 13, wherein the polymerization is conducted in presence of less than 0.05% by weight, based on the total weight of the monomers in monomer mixtures I and II.

16. A coating composition comprising the aqueous polymer dispersion according to claim 1.

17. The coating composition according to claim 16, wherein the coating composition has more than 20 gloss units, when measured with a glossmeter at an angle of 60° according to ASTM D523.

18. The coating composition according to claim 16, wherein the coating composition has a volatile organic content (VOC) less than 30 g/L.

19. The coating composition according to claim 16, wherein the coating composition is free of any organic solvent, plasticizer or coalescent agent and which forms a defect-free film at a temperature below 5° C. at a wet coating thickness up to 1 mm.

* * * * *